F. EVES.
BEATER FOR THRESHING MACHINES.
APPLICATION FILED APR. 7, 1905.

951,270.

Patented Mar. 8, 1910.

WITNESSES
F. J. Tanner.
C. Macnamara

INVENTOR
FRANK EVES
BY Paul & Paul
HIS ATTORNEYS.

UNITED STATES PATENT OFFICE.

FRANK EVES, OF STILLWATER, MINNESOTA.

BEATER FOR THRESHING-MACHINES.

951,270.  Specification of Letters Patent.  Patented Mar. 8, 1910.

Application filed April 7, 1905. Serial No. 254,420.

*To all whom it may concern:*

Be it known that I, FRANK EVES, of Stillwater, Washington county, Minnesota, have invented certain new and useful Improvements in Beaters for Threshing-Machines, of which the following is a specification.

The primary object of my invention is to provide means in connection with the threshing cylinder that will insure a complete separation of the grain from the straw.

The invention consists generally in various constructions and combinations, all as hereinafter described and particularly pointed out in the claims.

Figure 1:
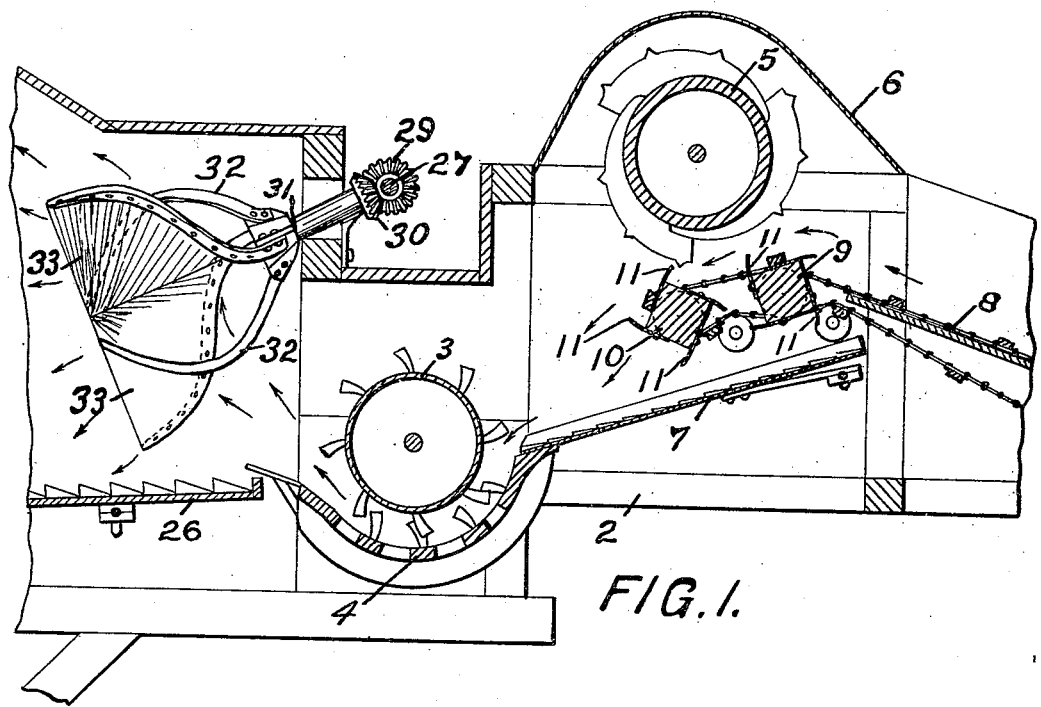
Figure 2:
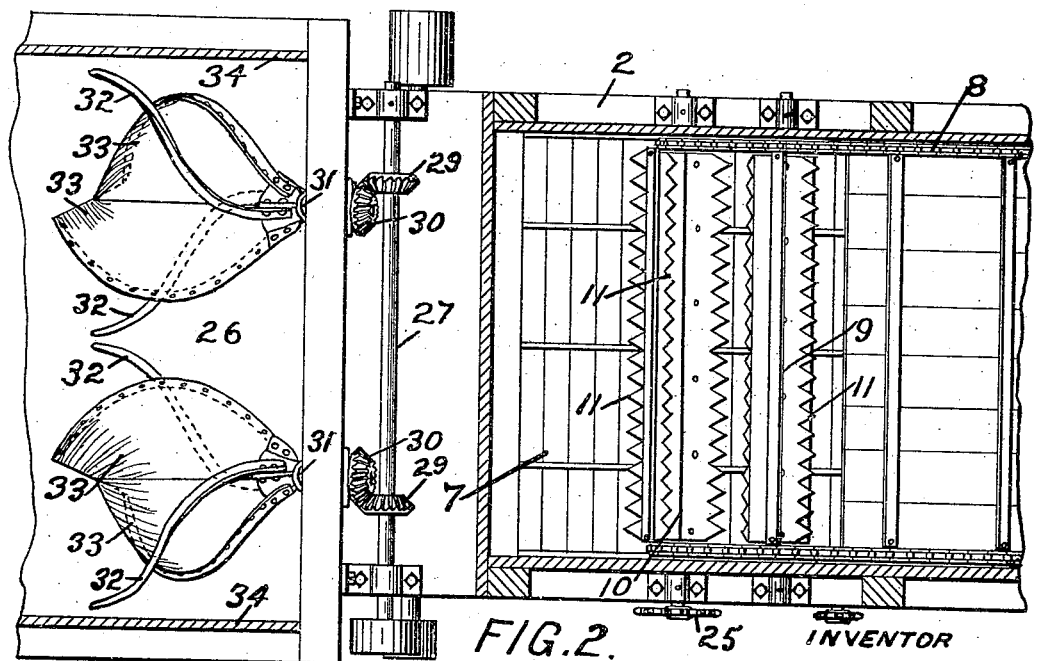

In the accompanying drawings forming part of this specification, Figure 1 is a vertical sectional view of a feeding apparatus embodying my invention. Fig. 2 is a plan section.

In the drawing, 2 represents a casing, 3 the threshing cylinder, 4 the concave, and 5 a band cutter operating beneath an arched casing 6.

7 is a feed pan, 8 is a bundle carrier, and 9 and 10 are two retarding rolls preferably square in cross section and arranged beneath the band cutter 5 and provided with rows of teeth 11 that project beyond the sides of the rolls 9 and 10. The bundle carrier 8 passes over these rolls and around sprocket wheels 12 thereon, the slats of the bundle carrier engaging the surfaces of the rolls and their movement being properly timed to avoid contact with the teeth 11.

I make no claim in this application to the mechanism covered by the foregoing description.

On the discharge side of the threshing cylinder is a straw rack 26, and over said cylinder is a shaft 27 driven from a belt 28 on the cylinder shaft and having beveled pinions 29 that mesh with similar pinions 30 on short shafts 31 that are arranged at an incline above the straw rack and overhang the threshing cylinder. Upon these shafts I provide a series of curved whipping or beating arms 32 that engage the straw as it leaves the cylinder and whip it thoroughly and throw it out to the sides of the casing, so that it will be evenly spread upon the straw rack and all the loose grain will be separated therefrom. I prefer to connect some of these beater arms by blades or webs 33 that coöperate with the arms to separate and loosen the grain from the straw.

The beaters are arranged to revolve toward one another, and the casing 34 inclosing them is considerably wider at that point than the length of the threshing cylinder, and consequently the straw will be thrown out to the sides and spread over a considerable area, and the separation of all the loose kernels of grain will be insured. By the time the straw has passed these beaters it will be thoroughly whipped and separated and all the grain loosened and allowed to pass down through the straw rack to the proper receptacle therefor.

The beater arms are spirally curved, as shown in the drawing, as I have found this form of arm is more effective to whip or beat the straw and spread it out to the sides of the machine. I prefer to arrange the beaters at an incline with respect to the straw rack, so that the lower ends of the arms will be near the rack and in position to spread out the straw in a thin sheet over the surface of the rack and prevent it from accumulating in bunches thereon.

I claim as my invention:

1. The combination, with a threshing cylinder and concave and a straw rack, of revolving beaters provided above said rack, said beaters comprising a series of spirally curved arms which are adapted to beat and whip the straw and spread it out to the sides of a machine, and imperforate plates connecting a pair of said arms and forming a web between them, substantially as described.

2. The combination, with a threshing cylinder, a concave and a straw rack, of revolving beaters located above and near the receiving end of said rack, said beaters consisting of a series of spirally curved arms which beat and whip the straw to the sides of said rack and a pair of said arms having a web arranged between them, substantially as described and for the purpose specified.

3. The combination, with a threshing cylinder, a concave and a straw rack, of a transverse shaft arranged above said cylinder, shafts arranged at right angles substantially to said transverse shaft, on each side of the longitudinal center of the machine and geared to said transverse shaft and inclined downwardly toward said straw rack, hubs mounted on said inclined shafts, spirally curved beaters mounted on said hubs and depending to a point near the receiving end of said rack, said beaters revolving toward one another and beating and whipping the straw laterally to the sides of the rack, substantially as described.

4. The combination with a threshing cylinder, a concave and straw rack, of a transverse shaft, shafts geared to said transverse shaft at right angles substantially thereto and on each side of the machine center, hubs mounted on said last named shafts, beaters carried by said hubs and arranged to revolve therewith toward one another, said beaters consisting of a series of arms arranged near the receiving end of said rack, the revolution of said beaters spreading the straw laterally in a thin sheet to the sides of said rack, substantially as described.

In witness whereof, I have hereunto set my hand this 28th day of March, 1905.

FRANK EVES.

Witnesses:
RICHARD PAUL,
C. MACNAMARA.